United States Patent [19]

O'Neill

[11] Patent Number: 4,480,086

[45] Date of Patent: Oct. 30, 1984

[54] RADIATION-RESISTANT COPOLYESTERS

[75] Inventor: George J. O'Neill, Kingsport, Tenn.

[73] Assignee: Eastman Kodak Company, Rochester, N.Y.

[21] Appl. No.: 530,812

[22] Filed: Sep. 9, 1983

[51] Int. Cl.³ .............................................. C08G 63/54
[52] U.S. Cl. ............................. 528/295.3; 528/295.5; 528/296; 528/302
[58] Field of Search ................. 528/295.3, 295.5, 296, 528/302

[56] References Cited

U.S. PATENT DOCUMENTS

| | | | |
|---|---|---|---|
| 4,045,431 | 8/1977 | Fagerburg | 528/295.3 |
| 4,075,180 | 2/1978 | Davis et al. | 528/302 |
| 4,107,150 | 8/1978 | Campbell et al. | 528/302 X |
| 4,254,001 | 3/1981 | Tung | 528/295.3 |

Primary Examiner—Lucille M. Phynes
Attorney, Agent, or Firm—John F. Stevens; Daniel B. Reece, III

[57] ABSTRACT

Disclosed are copolyester compositions derived from about 65–100 mole % 1,4-cyclohexanedicarboxylic acid, about 65–100 mole % 1,4-butanediol and about 15–35 mole % of a compound selected from the group consisting of dimer acid and dimer glycol. These copolyesters are resistant to gamma radiation.

7 Claims, No Drawings

RADIATION-RESISTANT COPOLYESTERS

TECHNICAL FIELD

This invention relates to copolyesters of 1,4-cyclohexanedicarboxylic acid, 1,4-butanediol and dimer acid or dimer glycol, particularly useful as extrusion blow moldable, flexible material which is also resistant to radiation.

BACKGROUND OF THE INVENTION

Various plastic devices used in medical applications require sterilization. Such devices include flexible tubing and small intravenous fluid bags for packaging drugs. Several methods of sterilization are currently available. These include steam, ethylene oxide and gamma radiation. Gamma radiation may be defined as electromagnetic radiation similar to x-rays except that gamma rays orginate in the nucleus of an atom whereas x-rays originate in the extra nuclear structure. Gamma rays usually have higher energies and shorter wavelengths than x-rays. Radiation normally causes polymers such as PVC and polypropylene to break down in chain length (loss of inherent viscosity) with corresponding loss of physical properties, discoloration, etc. Most of the medical tubing used today is sterilized by ethylene oxide but this method has a drawback in that there is a need to insure no residual ethylene oxide in the plastic material.

U.S. Pat. No. 3,091,600 discloses linear aromatic acid copolyesters modified with dimer glycols having 36 carbon atoms that are stable to sterilization by gamma radiation. This patent claims polyesters having melting points of at least 200° C. The compositions disclosed in the present invention all melt at less than 200° C.

U.S. Pat. No. 3,915,913 and U.S. Pat. No. 3,931,073 relate to polyesters of dimer acid modified with poly(tetramethylene terephthalate) which can be blended with a vinyl aromatic polymer such as polystyrene or an aliphatic hydrocarbon. U.S. Pat. No. 4,216,129 involves molding compositions comprising a blend of poly(tetramethylene terephthalate) and poly(tetramethylene terephthalate) modified with dimer acid. The compositions disclosed in the present invention are copolyesters and do not involve blends of admixtures in any way.

DISCLOSURE OF INVENTION

According to the present invention, copolyesters are provided which possess a balance of properties which render them useful as gamma radiation resistant, flexible copolyesters for medical materials. Among the properties obtainable which render the compositions useful are the following:

Crystallization half time of less than 1 minute.
Melting point less than 200° C.
Modulus 162–352 kg/cm$^2$ for tubing
  703 kg/cm$^2$ for small I.V. bags
  352–1406 kg/cm$^2$ (preferably 703 kg/cm$^2$) for blow molding
Elongation greater than 200%.
Resistance to gamma radiation.
Tensile strength greater than 70.3 kg/cm$^2$.

The fast crystallization half times are important in being able to process the copolyesters for medical applications. The mechanical properties are in the range that would render the polymers useful for medical applications and the mechanical properties do not deteriorate appreciably during gamma radiation. It is believed the overall balance of properties renders the copolyesters useful for the present invention.

The copolyesters according to this invention preferably have an inherent viscosity (I.V.) of at least 0.7, a melting point of less than 200° C., and are derived from 100 mole % of a dicarboxylic acid component and 100 mole % of a glycol component. The acids and glycols are (A) about 65–100 mole % 1,4-cyclohexanedicarboxylic acid or a polyester forming derivative thereof such as its dimethyl ester,
(B) about 65–100 mole % 1,4-butanediol and
(C) about 15–35 mole % of either dimer acid or dimer glycol.

Small amounts (up to about 5% of the glycol component) of other aliphatic or alicyclic, straight or branched chain glycols containing 2 to 40 carbon atoms may also be included in the glycol component.

Small amounts (less than 5%) of other aliphatic, cycloaliphatic or aromatic dicarboxylic acids having 4 to 30 carbon atoms may also be used.

The 1,4-cyclohexanedicarboxylic acid should have a trans isomer content of at least 80%. Such compounds are commercially available. 1,4-Butanediol is also commercially available.

The term "dimer acid" as used herein refers to a 36 carbon atom, long chain aliphatic dicarboxylic acid. The preparation and structure of the dimer acids is described in Journal of American Oil Chemists Society, 39, 534–545 (1962). It is generally prepared by dimerizing an unsaturated fatty acid containing 18 carbon atoms such as linoleic or linolenic acid or a monohydric alcohol ester thereof. It is recognized in the art that dimer acids are chemicals of unique properties. Several different grades of dimer acids are available commercially which vary in monomer and trimer content and iodine value. For example, dimer acid is available from Emery Industries, Inc. Preferably, the dimer acid used in this invention is substantially free of monomer and trimer fractions, which can be accomplished by distillation. Preferably, the dimer acid content is at least 95%. The dimer acid may be used in its hydrogenated or unhydrogenated form.

The dimer glycol is prepared by dimerizing unsaturated fatty acids such as linoleic and linolenic acids, and reducing the resulting acid or its ester to the corresponding glycol. The preparation and structure of the dimerized fatty acid and the glycol derived from it is described in J. Am. Chem. Soc., 66, 84 (1944), and in U.S. Patent to Johnston, No. 2,347,562. Several different grades of dimerized fatty acids are available from commercial sources and these acids vary in iodine value and in monomer and trimer content. The best results in obtaining copolyesters in accordance with this invention are usually obtained by employing a dimer acid fraction that has been substantially freed of monomer and trimer fractions by molecular distillation. The dimer glycol which is preferred for use in the invention is one containing approximately 36 carbon atoms and is obtained by reduction of an ester of the dimer acid fraction with copper chromite catalyst, such reduction resulting in conversion of ester to glycol and saturation of all double bonds which may have been present in the dimer ester.

The copolyesters are processable over a range of temperatures and molecular weights. The copolyesters have thermal and mechanical properties which render them useful as gamma radiation resistant, flexible copolyesters for medical applications.

The properties can be varied somewhat to render the polyesters useful in various applications. For example, the modulus can be varied depending on the level of modifier in the copolyester. The materials are useful in medical applications such as flexible tubing and small intravenous fluid bags for packaging drugs. The compositions have the advantage of allowing sterilization of the medical materials to be done using gamma radiation. The materials are also useful as blow moldable polyesters for medical applications such as containers for blood or intravenous solutions. The polyesters provide a simple, economical method of forming containers for medical applications.

The copolyesters of the present invention may be prepared using conventional melt polymerization techniques. Examples 1 and 2 illustrate conventional methods for preparing copolyesters using dimer acid. Similar procedures may be used in preparing copolyesters of dimer glycol.

EXAMPLE 1

A 500 ml, one-neck, round bottom flask was charged with 70.0 g (0.35 mole) of 95% trans, 1,4-dimethylcyclohexanedicarboxylate, 84.9 g (0.15 mole) Empol 1010, dimer acid from Emergy Chemical Co., 67.5 g (0.75 mole) 1,4-butanediol, and 1.27 ml of a 1.67% Ti solution of titanium tetraisopropoxide in n-butanol. The flask was equipped with a head having a nitrogen inlet, a take-off to remove volatile materials, and a socket joint to accommodate a stirrer. The stirrer shaft ran through the socket joint and had a ball joint attached by pressure tubing to the shaft to seal the socket joint.

The flask was swept with a slow stream of nitrogen, stirred, and immersed in a Belmont metal bath preheated to 200° C. Alcoholysis began as soon as the contents of the flask were molten. Heating and stirring at 200° C. continued for 100 min. and then the bath temperature was increased to 220° C. This heating period lasted 70 min. and then the bath temperature was increased to 260° C. At 260° C. the nitrogen inlet was closed and a vacuum pump was applied. Stirring and heating under reduced pressure (0.28 torr) was continued for 85 min. at the end of this time, the flask was removed from the bath and cooled at atmospheric pressure under a gentle stream of nitrogen. The polymer which was recovered by breaking the flask had an inherent viscosity of 1.02 and Tm=107° C.

The copolyester has 70 mole % repeat units from 1,4-cyclohexanedicarboxylic acid, 30 mole % repeat units from dimer acid and 100 mole % repeat units from 1,4-butanediol.

EXAMPLE 2

The same procedure was followed as in Example I except the following materials were charged to the round bottom flask: 80.0 g (0.40 mole) 95% trans 1,4-cyclohexanedicarboxylate, 56.6 g (0.10 mole) dimer acid, 81.0 g (0.90 mole) 1,4-butanediol, 1.12 ml to Ti catalyst solution. The resulting polymer had an inherent viscosity=1.21 and Tm=125° C.

The copolyester has 80 mole % repeat units from 1,4-cyclohexanedicarboxylic acid, 20 mole % repeat units from dimer acid and 100 mole % repeat units from 1,4-butanediol.

In the Tables, the following is a description of the copolyesters used.

Copolyester A—From Example 1
Copolyester B—From Example 2
Copolyester C—Same as Example 2, except terephthalic acid is used rather than 1,4-cyclohexanedicarboxylic acid
Copolyester D—Copolyester of:
  99.5 mole % 1,4-cyclohexanedicarboxylic acid
  0.5 mole % trimellitic anhydride
  1,4-cyclohexanedimethanol
  25 wt. % polytetramethyleneglycol
Copolyester E—Copolyester of:
  70 mole % 1,4-cyclohexanedicarboxylic acid
  30 mole % 1,12-dodecanedioic acid
  100 mole % 1,4-butanediol
Copolyester F—Same as Example 2, except 1,4-cyclohexanedimethanol is used rather than 1,4-butanediol Table 1 compares the stability of various copolyester films to sterilization by gamma irradiation as determined by the loss of inherent viscosity (I.V.). Table 2 summarizes the polymer composition, I.V., Tg, Tm, tensile modulus and strength, and % elongation of copolymers of this invention and those of other polymers. It can be seen that the use of an aliphatic acid other than dimer acid, i.e., 1,12-dodecandioic acid at mol % levels equivalent to dimer acid Copolyester E does not give a polymer with flexibility that approaches that of PVC with 30% DOP as plasticizer (140 kg/cm$^2$).

In the cases of PVC (Ex. 11) and Copolyester D, these polymers are not stable to irradiation by gamma rays at 1.5–5.0 MRads. The polymers of this invention besides being stable to gamma irradiation have the clarity, flexibility, and low processing temperature that make them especially useful as materials for making tubing and sight chambers.

TABLE 1

Effect of Gamma Irradiation on I.V. of Selected Polyester Elastoplastics

| Ex. | Copolyester | Radiation Dosage (MRads) | Inherent Viscosity Before Irradiation | After Irradiation (Initial) | After Irradiation (4 Mos.) |
|---|---|---|---|---|---|
| 3 | A | 5.0 | 0.92 | 0.95 | Not Determined |
| 4 | C | 4.0 | 0.89 | 0.83 | 0.82 |
| 5 | D | 4.0 | 1.05 | 0.86 | 0.81 |

TABLE 2

Polymer & Film Properties of Selected Polyester Elastoplastics Compared to PVC

| | | Polymer Properties | | | Film Properties | | |
|---|---|---|---|---|---|---|---|
| | | | DSC | | Tensile Modulus | Tensile Strength | % |
| Ex. | Copolyester | IV | Tg, °C. | Tm, °C. | kg/cm$^2$ | kg/cm$^2$ | Elongation |
| 6 | B | 1.18 | Not Visible | 120 | 844 | 253 | 1200 |
| 7 | A | 0.93 | Not | 107 | 281 | 246 | 493 |

TABLE 2-continued
Polymer & Film Properties of Selected Polyester Elastoplastics Compared to PVC

| | | Polymer Properties | | | Film Properties | | |
|---|---|---|---|---|---|---|---|
| | | | DSC | | Tensile Modulus | Tensile Strength | % |
| Ex. | Copolyester | IV | Tg, °C. | Tm, °C. | kg/cm² | kg/cm² | Elongation |
| 8 | E | 1.12 | Visible Not Visible | 114 | 1547 | Not Determined | Not Determined |
| 9 | F | 0.61 | Not Determined | 182 | 1336 | 169 | 390 |
| 10 | D | 1.05 | −3 | 214 | 1195 | 352 | 700 |
| 11 | Polyvinyl Chloride with 30% dioctyl phthalate as plasticizer | Not Determined | −30 | Not Determined | 140 | 190 | 340 |

All inherent viscosities are determined at 25° C. in a (60/40 by weight) mixture of phenol/tetrachloroethane at a concentration of 0.5 g/100 ml.

In the examples, the polymers are extruded into a 10 mil film on a Brabender extruder. The I.V. is determined subsequent to extrusion. The radiation dosage is the minimum dose of gamma irradiation the sample received. All the examples of copolyesters according to this invention have crystallization half times of less than 1 minute and melting points of less than 200° C.

Crystallization half times and melting points of the copolymers in the examples according to this invention are less than 1 minute and less than 200° C. respectively. Discoloration due to radiation exposure is minimal.

The crystalline melting point, $\Delta H_f$, and $T_g$ referred to above are measured by conventional means using a Differential Scanning Calorimeter.

Ester forming derivatives of the acids referred to herein can be employed, if desired, to prepare the copolyesters of this invention. Examples of such ester forming derivatives are the anhydrides, esters and ester chlorides of such acids.

One of the commonly used parameters for describing the crystallization rate of a polymer is the crystallization half-time, $t_{\frac{1}{2}}$. The crystallization half-time is simply the time at which the crystallization of the originally amorphous sample is half completed according to the method used to monitor crystallinity and may be determined in conventional manners. The half-time is strongly dependent on the crystallization temperature. Reference is made to "Kinetics of Phase Change.II—Transformatin—Time Relations for Random Distribution of Nuclei" by Melvin Avrami, published in "Journal of Chemical Physics", Feb., 1940, page 212.

One way of determining the isothermal crystallization of a polymer is an approximateion described by the Avrami equation $$X = X_o \left(1 - e^{-(\frac{t}{\tau})^n}\right) \quad (1)$$

where $X_o$ is the limiting value of the crystallinity, X is isothermal crystallization, $\tau$ is a characteristic time determined by the polymer and the crystallization temperature, and n is the so-called Avrami exponent, generally in the range 2.0 to 3.5. The reduced crystallization half-time, $(t/\tau)_{\frac{1}{2}}$, is obtained by solving $$\frac{X}{X_o} = \frac{1}{2} = 1 - e^{-(\frac{t}{\tau})^n}_{\frac{1}{2}} \quad (2)$$

to get $$\left(\frac{t}{\tau}\right)_{\frac{1}{2}} = \sqrt[n]{\ln 2} \quad (3)$$

The DSC response obtained would be described by differentiating equation (1) with respect to time to get $$\frac{dX}{dt} = X_o \frac{n}{\tau} \left(\frac{t}{\tau}\right)^{n-1} e^{-(\frac{t}{\tau})^n} \quad (4)$$

This function has a maximum for all n>1. Differentiating equation 4 with respect to time, setting the derivative equal to zero and solving to $t/\tau$, one finds the maximum of dX/dt, which is the peak of the DSC curve, to be located at $$\frac{t_p}{(\tau)} = \sqrt[n]{\frac{n-1}{n}} \quad (5)$$

where $t_p$ is the time required to reach the peak of crystallization exotherm. The ratio of $t_p/(\tau)$ to $(t/\tau)_{\frac{1}{2}}$, $$\frac{(t_p)}{\tau} \bigg/ \left(\frac{t}{\tau}\right)_{\frac{1}{2}} = \frac{t_p}{t_{\frac{1}{2}}} = \sqrt[n]{\frac{n-1}{n \ln 2}} \quad (6)$$

The ratio $t_p/t_{\frac{1}{2}}$ is between 0.85 and 1.04 for n>2. The curve of $t_p$ vs. crystallization temperature is a sufficient approximation of the curve $t_{\frac{1}{2}}$ vs. crystallization temperature.

Another use for copolyesters according to this invention is for the production of blow moldable polyesters for biomedical applications. Biomedical containers such as those used for blood and intravenous solutions are currently made of glass or poly(vinyl chloride) (PVC). Glass is being replaced because of its weight, bulkiness, and susceptibility to breakage. Replacements for PVC are being sought because of the lack of consumer confidence in this material. PVC containers are made from extruded film by a rather involved process. Pellets are extruded into films. The film is cut to the required sizes and two pieces are sealed on the sides and at the ends to form a bag. The bag is also fitted with one or more tubing connections. A simpler method of forming containers or bags for biomedical applications would be highly desirable. Extrusion blow molding of film or bottles should offer a significant reduction in the number of steps, thus, the cost of producing biomedical containers. Extrusion blown film would require sealing two edges instead of four. The use of extrusion blown bottles for containers would be even simpler than using extrusion blown film since a bottle having the desired shape and openings could be blown in one step. PVC used in many biomedical applications such as containers for blood and intravenous solutions cannot be blow molded because of its high plasticizer content.

If desired, dyes or dye receptive agents, color stabilizers and various other adjuvants may be added to the copolyester adhesives to meet certain specific end use requirements. Such additives would normally be added as such to the polymerization mixture in which the copolyester is produced.

As used herein, the inherent viscosity (I.V.) is measured at 25° C. using 0.50 gram of copolyester per 100 ml. of a solvent consisting of 60 percent by weight phenol and 40 percent by weight tetrachloroethane.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

I claim:

1. Copolyester compositions derived from 100 mole % of a dicarboxylic acid component and 100 mole % of a glycol component, said copolyester consisting essentially of repeat units from about 65–100 mole % 1,4-cyclohexanedicarboxylic acid, about 65–100 mole % 1,4-butanediol and about 15–35 mole % of a compound selected from the group consisting of dimer acid and dimer glycol.

2. Copolyester compositions according to claim 1 comprising about 15–35 mole % of dimer acid.

3. Copolyester compositions according to claim 1 comprising about 15–35 mole % of dimer glycol.

4. Copolyester compositions according to claim 1 wherein said 1,4-dimethylcyclohexanedicarboxylic acid is at least 80% trans isomer.

5. A blow molded container comprising the copolyester composition of claim 1.

6. A flexible container of sheet material comprising the copolyester of claim 1.

7. Extruded tubing comprising the copolyester composition of claim 1.

* * * * *